United States Patent [19]
Mamin et al.

[11] Patent Number: 4,883,934
[45] Date of Patent: Nov. 28, 1989

[54] MACHINE USING A WIRE FOR USE IN ELECTROEROSION

[75] Inventors: Pierre-Alexandre Mamin, Geneva, Switzerland; Bernard Babel; Francois Balleys, both of Petit-Lancy/GE, Fed. Rep. of Germany

[73] Assignee: Charmilles Technologies S.A., Meyrin, Switzerland

[21] Appl. No.: 176,874

[22] Filed: Apr. 4, 1988

[30] Foreign Application Priority Data

Apr. 3, 1987 [CH] Switzerland ............... 1290/87-6

[51] Int. Cl.⁴ .................................... B23H 7/10
[52] U.S. Cl. ........................... 219/69.12; 204/224 M
[58] Field of Search .............. 219/69 W, 69.12, 69.16; 204/206, 224 M

[56] References Cited

U.S. PATENT DOCUMENTS

| 4,123,645 | 10/1978 | Shichida et al. | 219/69 W |
| 4,205,212 | 5/1980 | Ullmann et al. | 219/69 W |
| 4,379,042 | 4/1983 | Inoue | 219/69 W |
| 4,420,671 | 12/1983 | Bonga | 219/69 W |
| 4,431,896 | 2/1984 | Lodetti | 219/69 G |
| 4,453,070 | 6/1984 | Bonga | 219/69 W |
| 4,460,816 | 7/1984 | Bonga | 219/69 W |
| 4,461,942 | 7/1984 | Delpretti | 219/69 W |
| 4,751,362 | 6/1988 | Girardin | 204/206 |

FOREIGN PATENT DOCUMENTS

| 3524377 | 1/1987 | Fed. Rep. of Germany | 219/69 W |
| 56-39831 | 4/1981 | Japan | 219/69 W |
| 61-76216 | 4/1986 | Japan | 219/69 W |

Primary Examiner—A. D. Pellinen
Assistant Examiner—Geoffrey S. Evans
Attorney, Agent, or Firm—Gifford, Groh, Sheridan, Sprinkle and Dolgorukov

[57] ABSTRACT

A machine which uses electroerosion with an electrode piece by means of a stretched electrode wire unwound between two wire guides with at least one device with crossed movements to fabricate other pieces, these wire guides are equipped to displace in a parallel plane to that of the trajectory and to cut off in this way by inclining the wire to a predetermined angle in relation to a neutral perpendicular axis to this plane and to make it pivot on itself around a mobile axis parallel to this neutral axis passing by this guide and displacing itself with it. It presents also an equipped device in order to subjugate the rotation of the guide wire to displacements of the device to crossed movements. At least one of the wire guides is in preference to an open guide open to a gap.

9 Claims, 2 Drawing Sheets

MACHINE USING A WIRE FOR USE IN ELECTROEROSION

BACKGROUND OF THE INVENTION

The invention deals with a device for electroerosion with a piece of electrode by means of an electrode wire stretched and unwound between two wire guides. In their simplest forms, such devices permit cutting a piece longitudinally in a trajectory situated in a plane called the principal plane perpendicular to the stretched wire between the guides. This allows for a right angle; otherwise, in general; cutting of all the surfaces generated are perpendicular to the principal plane.

In order to obtain more general forms, i.e. pieces to be machined, etc.; it is necessary that the wire should incline in relation to the normal principal plane: the neutral axis. It follows that the piece is tilted in relation to the plane in order to machine finish it. Many methods have been proposed to accomplish the first alternative. Three types can be distinguished:

(a) Displacement of the guides in relation to the other, parallel to the principal plane, combined with the rotation of the guides around a parallel axis to this principal plane as described by U.S. Pat. Nos. 4,431,896, 4,460,816, 4,461,942 and 4,453,070 and German Pat. No. 1,615,508 or in EP Pat. No. 201.911. This displacement could be obtained by means of a different apparatus; a table of cross-movements; hydraulic apparatuses that translate according to combined axes and to rotating tables. etc . . . ;

(b) A tilting according to 'Cardan' of the whole ensemble formed by two guides around two axes of rotation situated in the plane of the cutting trajectory, such as described in U.S. Pat. No. 4,485,288 or in German Pat. DE No. 2,413,627.

(c) A combination of rotation of guided wires around an axis of parallel rotation to a neutral axis with displacement of one of the guides in relation to the other, parallel to the principal plane, as an example, U.S. Pat. Nos. 4,123,645 and 4,420,671.

In practice, the second method which is the only one which preserves the length of the stretched electrode wire between two guides whatever the angle of inclination; demands an increase in free space so rotations can be accomplished without collisions, and in particular the apparatus fixes the piece to be tooled, or machined, or finished. This proves to be difficult for obtaining precision when machine finishing by electroerosion.

The first method presents equal inconveniences in regards to the phenomenom of incumbrance, in terms of machine finishing at a satisfactory speed, and approaching each other as much as possible. The heads of the machine finishers must carry the guide wire on the surface of the piece to be machine finished. This small space situated inbetween the piece and the outer limit of the heads of the machine doesn't permit the inclination of an important angle of the heads to be machined, and therefore, the wire electrode. One is limited to the smaller angles of stripping or machining.

Therefore one of the goals of the current invention is to finish with great 'strippage', that is to say to effect the cuttings of a piece according to the surfaces of a strong inclination of the angle of the wire electrode, with the neutral axis being important: i.e. more than 30°. This is because the present invention has reference to a third method. This is for an object for machine finishing by electroerosion with a wire electrode. This is by means of the stretched wire electrode wound between two wire guides with at least one device with crossed movements carrying these guide wires and adjusting to the displacement in a plane parallel to the cutting trajectory, in such a fashion as to incline the wire to a predetermined angle in relation to a neutral axis perpendicular to this plane. This is characterized by this device, and is equally adjustable in order to be able to pivot the wire guide over itself around an axis parallel to the neutral axis, passing by the guide and displacing itself with it. It can also be characterized by an adjustable device in order to subjugate the wire guide to these placements of the device, to crossed movements.

As one projects to machine finish with great angles of inclination, the closed guides present certain inconveniences in part because of their limited precision. By closed guides one understands it is that by having in general; of the type, a symmetry of rotation of coils, or of the type of guide wires, guide barrels, or shanks; or of the type, as an example, described in U.S. Pat. No. 4,205,212. This deficiency in precision in particular, is due to the friction created with the advancement of the wire, and by constraining it. The latter occurs when it is strongly inclined in relation to the axis of the guide and its rigidity. There are increases in risks of breakage and conductivity. In order to decrease the speed of the machine finishings, therefore, one must decrease the speed of the rate at which the machine finishes by one half; for example when one finishes with an angle of 30° or more. Given on the other hand the encountered difficulties with threading and rethreading the wire in such guides, the machine according to the present invention holds the advantage for open guides.

These guides can have all kinds of configurations as described by U.S. Pat. Nos. 4,123,645 or 4,420,671. In general they present a gap or peripheral groove where the wire lodges according to the given profile of guidance. It could simply be a device with a uniquely pivotable small pulley, or small wheel, around a parallel axis; a neutral axis for a wheel or cylinder. This is pivotable around an axis parallel to a neutral axis, and passing preferably by their centers of symmetry, and pivotable also around their axes of revolution provided with a gap for guidance of the wire. The plane for this gap is preferably perpendicular to the axis of revolution. These guides can be conductors of electricity and serve to feed the wire standard current for its functioning.

The device of the current invention presents notable advantages to American patents, U.S. Pat. Nos. 4,123,645 and 4,420,671. In the present invention better precision is possible with the table with crossed movements rather than blocks which require manual direction or intervention, and turning disks which are described in U.S. Pat. No. 4,123,645; or with coupled screws with a rotating device as described in U.S. Pat. No. 4,420,671. Another disadvantage of U.S. Pat. No. 4,123,645 is the form of the guide wire which necessitates a disservice of orientation, in such a fashion as to maintain the plane of the gap within a predetermined angle with the direction of the cutting, in order to stabilize the electrode wire within the gap of the guide and to ensure the preciseness of the cutting. At the same time a simpler form of the wire guide in the current invention is an advantage to the coupled screw guides described in U.S. Pat. No. 4,420,671.

Above all, one can easily see that the construction of the present invention permits the positioning of the guides with all the necessary precision, without demanding the devices positioning of the guides in extremely low tolerances. In effect, where the wire guide (or guides), pivots on itself, that means that the parallel axis to the neutral axis around which this guide rotates, (passes evidently by preference) by its center of symmetry and moves with it in its displacements in a plane parallel to the principal plane. Consequently the horizontal shifting or unwedging, between this axis and the point where the wire leaves the guide, also rests weakly even when the wire is strongly inclined. The influence on the precision of the orientation of the guide(s) on the positionment at this point determines the exact position of the wire which therefore, remains equally weak. What simplifies this so much in the current invention is the mechanical realization of the device to orient the guide(s) and reduce crowding to acceptable values.

The member in the device is described in U.S. Pat. Nos. 4,123,645 and 4,420,671. The axis of rotation is fixed and passes through the center of turning plates on which the guides are fixed. It is therefore confused with the neutral axis when the guides are altered or shifted in a plane parallel to the principal plane in order to incline the wire. They cannot therefore pivot on themselves, but they affect a rotation around a neutral axis.

Another advantage to the present device is that it permits the orientation of the guides not to form a given angle with a trajectory to cut as it is described in U.S. Pat. No. 4,123,645 but in such a fashion that the planes of each of the profiles of guides, (that is to say that the trajectories imposed on the wire around the wire guide) should be coupled and contained as a part of the stretched wire between the two guides. This means that the wire doesn't rub strongly and it facilitates its gliding into the guides reducing the risk of its losing its place, and prevents the alteration of mechanical tension where there are changes in the angle of inclination.

Such an orientation was not possible with the known mechanisms:

In U.S. Pat. No. 4,123,645 the planes of the profiles of guidance are strongly parallel to the guide wire and have to be oriented in this fashion to make a given angle with a trajectory. They cannot be confused, except it the displacement of the destined guide that inclines the wire in relation to the neutral axis has been effected according to a single situated axis in the plane of the profile directing this guide. That is what limits the possibilities.

In U.S. Pat. No. 4,420,671 the wire guide are cylinders with a screw thread inclined in relation to the principal plane in order that the plane of the guides should be perpendicular to the principal plane. It is the rotation of each of the guides around their axes of revolution that make the wire advance in the direction of the axis. The axis of revolution of the two guides are crossed. The planes of the profile of guidance can never be confused nor can they contain a part of the stretched wire between the guides.

Furthermore, the invention evades the shifting or pushing of the guide around a parallel axis in the plane of the cutting trajectory of orientation. This simplifies construction and permits surrounding of the guide with a covering forming a nozzle for injection of the liquid that is used. This covering will not require a shifting around a horizontal axis, and will be more easily conformed in this way, so that the mouthpiece of the nozzle rests constantly in the immediate proximity of the piece to be fabricated, which is a vital condition for the speed and positioning of the machining.

DETAILED DESCRIPTION OF THE PREFERRED EMBODIMENT

Figure 1:
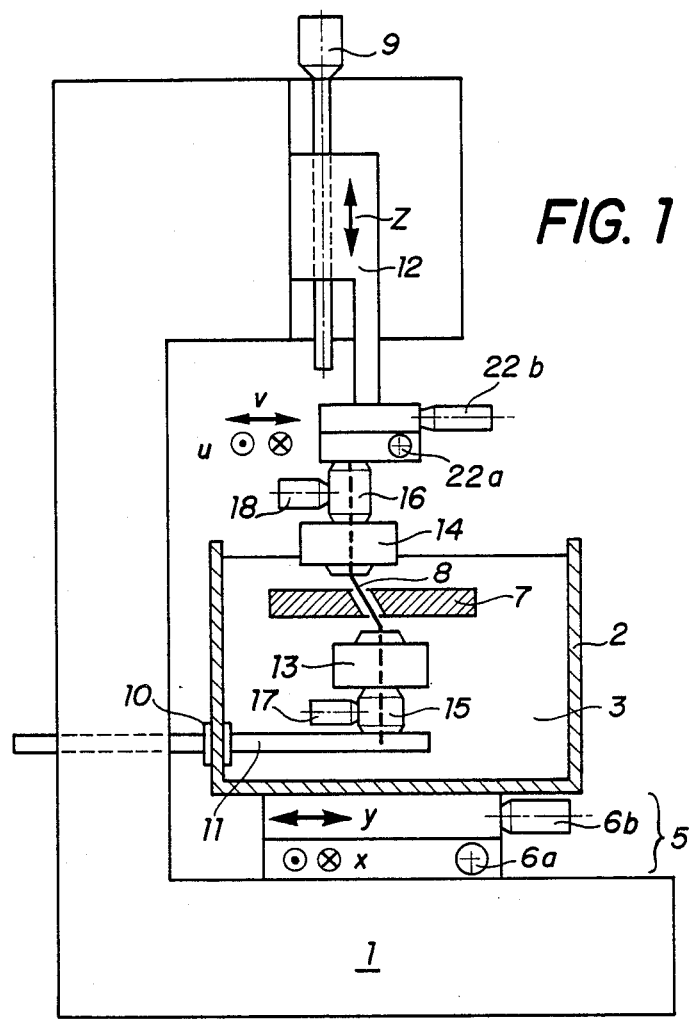
FIG. 1 is a schematic cross-section of a device according to the invention.

In FIG. 1 and the number 1 designates the housing of a machine of an electroerosion machine using a wire, and 2 designates the tank or reservoir of this machine that can be filled with a dielectric liquid 3. The reservoir is mounted on a table 5 with crossed axes X, Y, driven by two motors 6a and 6b. A piece 7 to be manufactured is immersed in the dielectric 3, and moves with the table 5 in the directions X and Y, so that it is in the horizontal plane of the cutting trajectory. A lower arm 11 rests, fixed in relationship to the housing 1, a mobile joint 10 being used in the front of tank 2 in order to allow relative movements of the arm 11 and the tank 2. An upper arm 12 can be moved vertically in the axis Z with a motor 9, for use in machining pieces of different thicknesses. The active portion of a wire electrode 8 is stretched between two guides (not visible in the drawings) each one enclosed in one of the two machining heads 13 and 14. The wire is constantly renewed during useage and is fed continuously to one of the heads and evacuated by the other head by known means not shown in this drawing for more clarity.

The lower head 13 is mounted to the arm 11 in a parallel fashion with an intermediary of a rotating member 15 turning around a vertical axis under the action of a motor 17, capable of giving the lower head 13 complete orientation around this axis. In a similar fashion the upper machining head 14, is carried by a rotating device 16 which can orient in every sense around the vertical axis. Contrary to the lower rotating member 15, this secondary rotating device 16 is not directly mounted on the arm that carries it, but on an intermediate member or a table with auxiliary cross axes U and V, which is fixed to upper arm 12. Each of the cross axes U and V of the auxiliary table as it is presented, lie parallel to one of the axes X, Y of the table 5 that supports the tank; however, this is not a requirement. The auxiliary table 20 is activated in the directions u and v by two motors 22a and 22b whose action permits the inclination of the working piece of wire 8 in all directions in relation to a neutral axis normal to the plane of the cutting trajectory; shifting thanks to the horizontal mounting displacement of the heads 13 and 14, one in relation to the other. For a given value of the inclination, this displacement will be a function of the vertical distance between the guides determined by the position in the direction Z of the upper arm 12, as developed in relation to FIG. 3b. Once the motors 9, 22a and 22b arrest the wire 8 they will keep the same inclination independent from the movement of the table 5, and the rotations of 15 and 16 that serve to orient the guides in relation to the wire. All the aforementioned motors are put into action in this way, in a known fashion by a unit of digital commands to achieve the desired trajectory in the principal planes X, Y: the amount of inclination of the wire in relationship to the vertical, and the orientation of each guide head around a vertical axis. In general, given this orientation it will be commanded in a way so as to be co-planar to the trajectory of the wire to the interior of the two guides.

Figure 2:
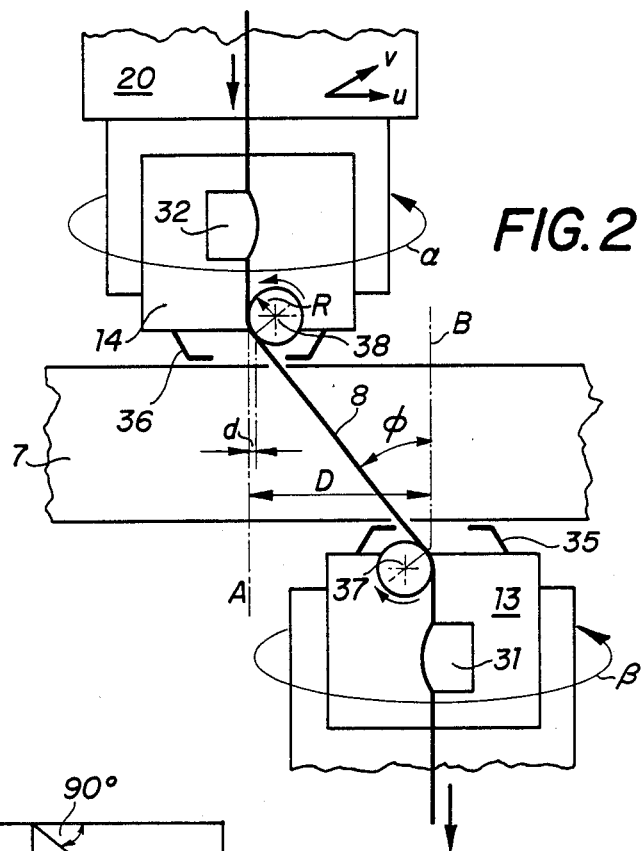
FIG. 2 is a more detailed drawing of the path of the wire in the vicinity of the machine finishing pieces.

In FIG. 2 the drawings shows in greater detail the trajectory of the wire 8 in relation to the piece 7 to be fabricated. From there for the most part, details are omitted. In this particular Figure the wire 8 is taken from the upper machining head 14 mounted on the auxiliary table 20 which is movable in the u and v axes. The upper machining head 14 can take whatever orientation it wants $\alpha$ around the axis A parallel to the neutral axis B. This head carries a contact 32 for adding the wire of the current useage so that the small wheel 34 serves as a guide as for the rotating member around the axis 38 orthogonal to the neutral axis. The beam R from the wheel will be chosen to be large enough in comparison to the wire so the latter can be considered to be infinitely flexible. This eliminates the errors of guides due to inherent rigidity of the wire. The lower machining head 13 is equally movable and can take whatever orientation one desires, around an axis B conformed here with the neutral axis. In general, one maintains that $\beta$ equals $\alpha$, and will control two angles with the aid of the same operation. The lower machining head 13 is comprised of an abrader 31 for the feeding of the current that is being used by the wire and the small wheel 13 which serves as an lower guide. This wheel turns freely around an axis 37 orthogonal to the neutral axis and its beam. It satisfies the same conditions as the upper wheel 34.

Each one of the heads of machining heads is comprised of nozzles 35 and 36, for concentrating a jet of liquid in the direction of the cutting that is realized in one piece. These nozzles can either turn with the head of useage around the axes A and B, or remain in the same orientation; but their orifices 35 and 36 remain parallel to the plane of the cutting trajectory, also called the principal plane of useage, and can therefore be placed in immediate proximity to the piece 7 to be machined as shown in FIG. 2, and to stay at this distance independently from the inclination of the wire which controls the speed and the precision of the machining. Moreover, when it comes to cutting with this device, the nozzle and a large diameter of its mouth it allows a generous pouring into a furrow which has already been cut at the end of the wire. What proves to be most beneficial for this application is a jet of small diameter directly and exactly moving along the wire so that they produce the same orientation of the nozzle.

When it comes to straight cutting off, that is to say in a neutral position when axes A and B are conformed, the orientation of $\alpha$ and $\beta$ do not merge over the position of the wire 8 between the guides 33, 34. The precision of this machining from the devices which determine the orientation of $\alpha$ and $\beta$ as to the axes A and B, are shifted or displaced from a distance D as in FIG. 2. The wire being inclined at an angle $\phi$ over a neutral axis, an imprecision of orientation $\Delta\alpha$ and of the superior head will result in a displacement of d, of the superior extremity of the segment of the stretched wire between the guides where; it is the distance between the axis A and a straight line V passing through the point where the wire 8 leaves the small wheel 34 in the direction of the lower wheel. The distance d is such that $d = R(1 - \cos\phi)$ with $0 \leq \phi \leq 90°$; there is no limitation on the angle of strippage $\phi$.

As for the angle $\phi$, it varies from 0° to 90°, d varies from O to R. If the inclination $\phi$ of the wire, on the neutral axis remains less than 45°, one will have $d < R(1 - \sqrt{2}/2)$ or $d < 0,3R$.

The same reasoning applies to an error in positioning of the wire due to an imprecision in the orientation $\beta$ of the inferior machining head 13. Analogous reasoning applies to the vertical shifting in the function of the inclination of the wire from the point where it leaves the small wheel. This follows contrary to the known adjustments, the error of the machining due to a tolerance in the orientation of the heads when they are altered one in relation to the other. One always remains weak, and possesses a superior limit easy to determine and independent of the value of the shifting.

Figure 3A:
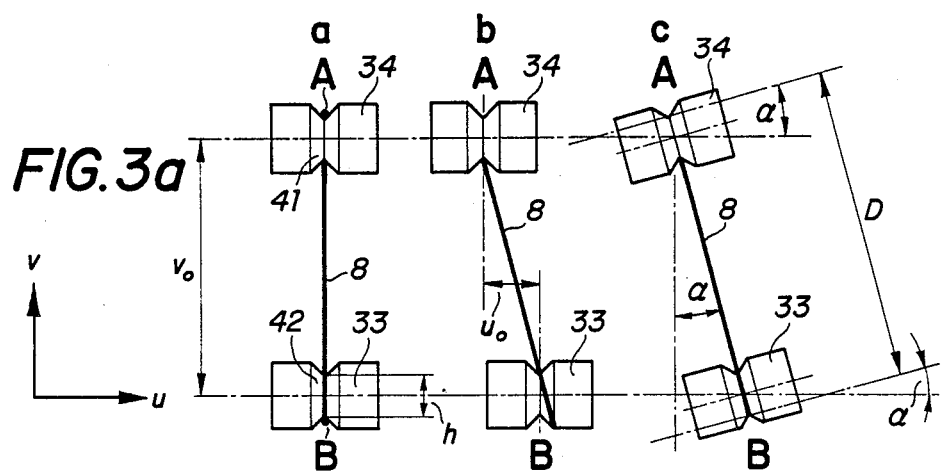
FIG. 3a shows three ways in which the plane of the two guides can exist in the form of a small wheel(s) such that the wire is in the plane of the machine finishing.

FIG. 3a is a view from above that shows the orientation of the guides in three different positions that concern the reciprocal shifting of the guides from a distance $u_o$ according to the axis u, and from a distance $v_o$ according to the axis v. Each one of the guides 33, 34 is a cylindrical small wheel consisting of peripheral grooves 41, 42 where the wire 8 is wound, with h being the diameter of the small wheel grooves. As in FIG. 2, A and B designate the axes of rotation of the superior or upper head of machining in respect to the inferior or lower head of the machine, they being perpendicular to the plane of design, in this case of FIG. 3a. In order to simplify these, one supposes that in the neutral position of the origin (not shown), that is to say when the axes A and B of the machining heads are merged with the neutral axes, the axes of the small wheels 33, 34 are orthogonal to the direction v. The inclination of the wire can be obtained in three steps. A displacement $v + h$ makes changes in the neutral position into a position of FIG. 3a, a subsequent displacement $u_o$ makes changes into the position b, and finally a rotation of the angle $\alpha$ and of the two heads around the axis A and B respectively, makes changes into the position C in which the planes bisect the furrow of the two small coinciding wheels that contain the stretched wire between them. This is the embodiment of the preferred work in which the wire 8 undergoes a minimum of constraint and stays well in the profile of the guidance of each guide. Practice has shown when the wire doesn't stay in the bisected plane of the groove it follows that errors of machining occur.

Figure 3B:
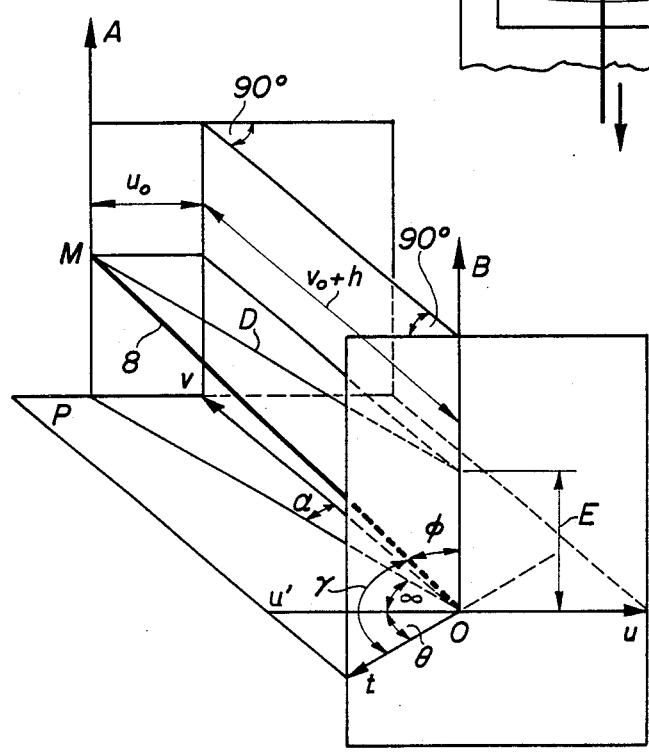
FIG. 3b illustrates the relationship between the displacement of the guides and the inclination of the wire.

Knowing E, the distance between the guides before inclining the wire; and h, the diameter of the wire, and the wire guides; it is possible to calculate the values, in this instance, to give $u_o$ and $v_o$ and the angle $\alpha$ in order to obtain an angle of stripping $\phi$ with the wire 8, the latter making a predetermined angle with $\alpha$; with the cutting trajectory, to its tangents in the principal plane, that is with the direction t indicated in FIG. 3b. This direction t with the axis u and angle $\theta$ varies in the course of useage; with the trajectory not being rectilinear. One should note that $\alpha$; the angle from which it should pivot the wire guide in order to re-orient them according to the present invention, is also the angle between the axis v and the projection of the wire in the defined plane P, defined by the axes u and v (v being perpendicular to u).

In effect, as shown in FIG. 3b, $D \cos(\theta + \infty) = OM \cos\gamma$ or, $OM = D/\sin\phi$ and $\infty = 90° - \alpha$, therefore cos $(\theta+90°-\alpha)=\cos\alpha/\sin\phi=\sin(\alpha-\theta)$; in this way one obtains the instaneous value of $\alpha$, and as $D=u_o^2+(v_o+h)^2=(E\,tg\phi)^2$ and $u_o/(v_o+h)=tg\alpha$. One can also determine $u_o$ and $v_o$: d' or $v_o=E\,t\,g\,\phi\,\cos\alpha-h$ and $u_o=E\,tg\phi\,\sin\alpha$.

Therefore, the determination of $\alpha$ (and of $u_o$ and $v_o$) as a function of the variation of the angles $\phi$ and $\theta$; it is possible that this should be the chosen value for the angle $\gamma$.

If the machine already has these capabilities to subjugate the values of $u_o$ and $v_o$, to variations of $\phi$ and $\theta$, one can also determine, due to the relationship that governs $u_o$ and $v_o$: $t\,g\,\alpha-u_o/(v_o+h)$.

The machine according to the present invention will be preferentially embodied by a device for crossed movements, whose movements according to u and v will be subjugated to the angle of strippage $\phi$, in this way and eventually to those of $\theta$ and $\gamma$; for example, two activated and programmed devices in order to make the wire guides pivot at an angle $\alpha$, they being equally subjugated to the value of $\phi$ (and eventually to those of $\theta$ and $\gamma$).

It is important to note that in the case where the wire is kept perpendicular to the cutting trajectory, one notes in considering FIG. 3b, at the point O, that the projection of the wire on plane P is equally perpendicular to the direction t; and therefore $\alpha=\theta$; the angle from which the wire guides pivot in order to reorient, according to the present invention, is equal to the angle $\theta$, defined below.

It is equally important that the wire guides have the capability of pivoting around the axis which should not be merged with the axes A and B as previously defined. The projection of these pivoting axes on the diameter; in particular, these axes can pass by the center of symmetry of this profile; in this case: $t\,g\,\alpha=u_o/v_o$ and $D^2=(u_o+h.\sin\alpha)^2+(v_o=h.\cos\alpha)^2$.

Equally remarkable is that the angle at which the wire guides should pivot in order to re-orient them according to the present invention, is exactly equal to the angle $\alpha$. In effect, the re-orientation has as its goal to maintain their axes of revolution perpendicular to the projections of the wire in the principal plane. When pivoting at an angle $\alpha$, it should be the same for the axes of revolution of the guides, in order words $u_o$ and $v_o$ having been determined by $\alpha=\arctan(u_o/v_o)$.

The decomposition in three movements described here is only given to the title of illustration and that when the movements of the heads are commanded in numerical order the course of events will, in general, be simultaneous. One must also note that the guides in the form of small wheels 33 and 34 can be replaced by fixed slabs by a material resistant to abrasion in order not to prematurely wear by the friction of the wire. In these two cases, the lateral maintenance of the wire can be achieved by grooves in which it is engaged, or by other means. In these two cases equally, it can be advantageous to omit the friction of the pieces 31 and 32 (FIG. 2), for feeding of the wire into the electrical current of useage, and to effect this feeding over the guides 33, 34, which must be made of a conductive material:

In these examples of realization above, the wire guides are open guides symmetrical to the revolution whose profile of guidances is in the same plane as the center of symmetry. The present invention is not limited to this type of guide and positioning. In particular, if one of the guides is not displaced in relation to the neutral axis, in a plane parallel to the principal plane, it could be a closed guide that would suppress the operation of recentering when one changes the diameter of the wire (because of the positionment of open guides, they must be adapted to the diameter of the electrode wire), and permits the setting in action a single turning broach in order to orient only one of the two guides.

One must discuss the advantages of open guides: less friction and the disappearance of the need to thread and rethread as is indicated in the introduction, the possibility of utilizing the wires in all their diameters without having to change their guides, the configuration is simpler and less expensive; and the angle of stripping is limited. Moreover, since the guide turns on its axis of revolution, it wears very slowly and has little effect on the mechanical tension of the wire and its function as an angled surface. The error of positioning of the wire is very slim, even with great angles of strippage; it is for example closer to micrometers with an angle of strippage being 30°, a guide of 10 milimeters in diameter and a turning broach indexed at 4,000 notches per revolution.

The dismantling of the wire guide in its parallel plane or principal plane can be made by a table of crossed movements as is illustrated below, for example to a translation being able to decompose itself according to two axes of cartesian coordinates u and v, by a mechanism combining a translation following one of these axes with a rotation.

We claim:

1. A machine for usage of electroerosion of an electrode piece by means of a stretched electrode wire and divided between two wire guides with at least one device of cross movements carrying one of these wire guides and arranged in such a fashion in order to displace it into a parallel plane to the one of the trajectory to cut in a fashion by inclining the wire to a predetermined angle in relation to a neutral perpendicular axis to this plane and characterized by the fact that this device is equally arranged in order to rotate the wire guide around a mobile axis parallel to the neutral axis passing by this guide and displacing itself with it by a device put into action in order to subjugate the rotation of the wire guide to displacements of the device to cross movements.

2. The machine of claim 1 characterized by a device put into action in order to subjugate the rotation of the wire guide to predetermined inclination displacements of the device to cross movements.

3. The machine of claim 1 characterized by two wire guides that rotate each around a mobile axis and a parallel axis in parallel to a neutral axis passing by each one of the guides and displacing itself with them.

4. A machine for usage of electroerosion of an electrode piece by means of a stretched electrode wire and divided between two wire guides with at least one device of cross movements carrying one of these wire guides which is an open guide having a gap in which lodges the electrode wire according to a certain profile of guidance and arranged in such a fashion in order to displace it into a parallel plane to the one of the trajectory to cut in a fashion by inclining the wire to a predetermined angle in relation to a neutral perpendicular axis to this plane and characterized by the fact that this device is equally arranged in order to rotate the wire guide around a mobile axis parallel to the neutral passing by this guide and displacing itself with it.

5. The machine of claim 4 characterized by an open wire guide system having a small turning wheel around an axis of revolution noticeably parallel to the plane of trajectory to cut and supplied with a peripheral groove in which the wire fits, the plane of this groove being perpendicular to the axis of revolution.

6. The machine of claim 4 characterized in such a way that the wire guides are conductors of electricity and serve to feed the wire with a standard current.

7. The machine of claim 4 characterized by the fact that the orientation of the wire guide to the gap is subjugated to the displacements of the device to cross movements in such a way that the plane containing this gap contains an equal part of the stretched wire between the guides.

8. The machine of claim 4 characterized by a device equipped or arranged in order to orient the open wire guides to the gap in such a way that two thin profiles of guidance should be coplanar with the stretched wire between the guides.

9. The machine of claim 4 characterized by an open wire guide in the form of a fixed slab or a groove fitted with grooves in which the wire moves.

* * * * *